(12) United States Patent
Reid et al.

(10) Patent No.: US 11,055,945 B2
(45) Date of Patent: Jul. 6, 2021

(54) ACCESS CONTROL SYSTEMS AND METHODS FOR MULTI-UNIT PREMISES

(71) Applicant: Hubbell Incorporated, Shelton, CT (US)

(72) Inventors: Jeffrey Turner Reid, Sinking Spring, PA (US); Andrew Thexton, Richmond, VA (US)

(73) Assignee: Hubbell Incorporated, Shelton, CT (US)

( * ) Notice: Subject to any disclaimer, the term of this patent is extended or adjusted under 35 U.S.C. 154(b) by 15 days.

(21) Appl. No.: 16/412,989

(22) Filed: May 15, 2019

(65) Prior Publication Data

US 2019/0355194 A1 Nov. 21, 2019

Related U.S. Application Data

(60) Provisional application No. 62/680,760, filed on Jun. 5, 2018, provisional application No. 62/671,467, filed on May 15, 2018.

(51) Int. Cl.
*H04M 3/42* (2006.01)
*G07C 9/00* (2020.01)
(Continued)

(52) U.S. Cl.
CPC ........... *G07C 9/38* (2020.01); *G07C 9/00571* (2013.01); *G07C 9/00904* (2013.01);
(Continued)

(58) Field of Classification Search
CPC ............ G07C 9/00571; G07C 9/00896; G07C 9/00904; G07C 9/00944; G07C 9/38; G07C 2009/00769; G07C 9/27; H04M 2201/14; H04M 2201/50; H04M 3/527; H04M 3/54; H04M 3/567; H04M 11/025; H04M 1/0291; H04M 1/006; H04M 1/72448;
(Continued)

(56) References Cited

U.S. PATENT DOCUMENTS 9,819,713 B2  11/2017  Siminoff et al.
2003/0058806 A1  3/2003  Meyerson et al.
(Continued)

OTHER PUBLICATIONS

PCT International Search Report and Written Opinion for corresponding PCT Application No. PCT/US2019/032420, dated Jul. 29, 2019, 11 pages.

*Primary Examiner* — Dionne Pendleton
(74) *Attorney, Agent, or Firm* — Michael Best & Friedrich LLP

(57) ABSTRACT

A method for access control of premises having a plurality of units includes receiving a selection of one or more units of the plurality of units associated with the premises from a first user via a primary interface device communicatively coupled to a network. The method also includes sending a call to one or more secondary interface devices based on the selection. The one or more secondary interface devices can be located in the one or more selected units. Further, the method includes monitoring for a trigger condition after the call is sent to the secondary interface device. Upon occurrence of the trigger condition, the method also includes forwarding, via the primary interface device, the call to a mobile device of a second user associated with the one or more units.

17 Claims, 5 Drawing Sheets

(51) Int. Cl.
  *G07C 9/38* (2020.01)
  *H04N 7/15* (2006.01)
  *H04M 3/527* (2006.01)
  *H04W 4/16* (2009.01)
  *H04M 3/54* (2006.01)
  *H04N 7/14* (2006.01)
  *H04M 1/02* (2006.01)
  *H04M 3/436* (2006.01)
  *H04W 12/08* (2021.01)
  *H04M 1/00* (2006.01)
  *H04L 29/06* (2006.01)
  *H04N 7/18* (2006.01)

(52) U.S. Cl.
  CPC ........ *H04L 65/1096* (2013.01); *H04M 1/006* (2013.01); *H04M 1/0291* (2013.01); *H04M 3/4365* (2013.01); *H04M 3/527* (2013.01); *H04M 3/54* (2013.01); *H04N 7/14* (2013.01); *H04N 7/147* (2013.01); *H04N 7/15* (2013.01); *H04N 7/186* (2013.01); *H04W 4/16* (2013.01); *H04W 12/08* (2013.01)

(58) Field of Classification Search
  CPC ............... H04M 2207/18; H04M 3/42; H04M 3/42161; H04M 3/42314; H04M 3/4234; H04M 3/436; H04M 3/46; H04M 3/546; H04N 7/142; H04N 7/147; H04N 7/15; H04N 7/186; H04W 12/08; H04W 4/16; H04W 4/33; H04W 4/00; H04L 12/4641
  See application file for complete search history.

(56) References Cited

U.S. PATENT DOCUMENTS

| | | |
|---|---|---|
| 2008/0310609 A1 | 12/2008 | Brady, Jr. et al. |
| 2011/0177797 A1* | 7/2011 | Vendrow ................ H04M 1/006 455/414.1 |
| 2013/0017812 A1 | 1/2013 | Foster |
| 2013/0045763 A1* | 2/2013 | Ruiz ................... H04M 1/0291 455/466 |
| 2014/0297418 A1 | 10/2014 | Gaur |
| 2015/0063192 A1 | 3/2015 | Zukas et al. |
| 2015/0279132 A1* | 10/2015 | Perotti ............... G07C 9/00309 340/5.52 |
| 2016/0180423 A1* | 6/2016 | Defoy ................ G06Q 30/0613 705/7.26 |
| 2017/0038915 A1 | 2/2017 | Choi et al. |
| 2017/0270732 A1* | 9/2017 | Troesch ................... G07C 9/27 |
| 2019/0007555 A1 | 1/2019 | Newman |
| 2019/0058783 A1 | 2/2019 | Reid |
| 2020/0021777 A1* | 1/2020 | Borukhoff ........... H04L 65/1089 |
| 2020/0186639 A1* | 6/2020 | Borukhoff ........... H04L 65/1076 |

* cited by examiner

ACCESS CONTROL SYSTEMS AND METHODS FOR MULTI-UNIT PREMISES

PRIORITY CLAIM

The present application claims the benefit of priority of U.S. Provisional App. No. 62/671,467, titled "Access Control Systems and Methods for Multi-Unit Premises," having a filing date of May 15, 2018, which is incorporated by reference herein. The present application also claims the benefit of priority of U.S. Provisional App. No. 62/680,760, titled "Access Control Systems and Methods for Multi-Unit Premises," having a filing date of Jun. 5, 2018, which is incorporated by reference herein.

FIELD

The present disclosure relates generally to access control systems and methods for multi-unit premises.

BACKGROUND

Video doorbells are a common feature in the residential market. Such doorbells allow the resident to view and talk to visitors at their door. For example, residential video doorbells act as doorbell for the residence and also include a camera to send video of the visitor to the resident's user device, such as a smartphone, tablet, PDA, wearable device, etc. As such, the resident can converse with the visitor via a mobile application on the user device.

Commercial offices and multi-resident buildings can have various solutions available for building access. One example solution includes a voice-only analog system. In this system, a visitor selects an office or residence and presses an associated button which rings or buzzes the appropriate office or resident. A voice-only conversation can be initiated by the tenant and, if desired, the tenant can "buzz" the door to allow the visitor to enter the building. Another example solution can provide a similar function, but includes both voice and video. In either of these example solutions, there is a door access unit that allows the selection of one of many offices or residences and a unit in each office or residence that allows for communication and access.

SUMMARY

Aspects and advantages of embodiments of the present disclosure will be set forth in part in the following description, or may be learned from the description, or may be learned through practice of the embodiments.

One example aspect of the present disclosure is directed to a method for access control of premises having a plurality of units. The method includes receiving data indicative of a selection of a unit of a plurality of units associated with the premises by a first user via a primary interface device communicatively coupled to a network. The unit can be associated with a second user. The method can include sending a call to one or more secondary interface devices based on the selection. The one or more secondary interface devices can be located in the one or more units. The method can include monitoring for a trigger condition after the call is sent to the one or more secondary interface devices. Upon occurrence of the trigger condition, the method can include forwarding the call over the network to a mobile device of a second user associated with the one or more units.

Another example aspect of the present disclosure is directed to an interface device assembly configured for allowing access to premises having a plurality of units. The interface device assembly can include a primary interface device communicatively coupled to a network. The primary interface device can include one or more processors and one or more memory devices. The one or more memory devices configured to store computer-readable instructions that, when executed by the one or more processors, cause the one or more processors to perform operations. The operations can include receiving a selection of one or more units of the plurality of units associated with the premises from a first user. The operations can further include sending a call to one or more secondary interface devices based on the selection. The one or more secondary interface devices can be located in the one or more units. The operations can further include monitoring for a trigger condition after the call is sent to the one or more secondary interface devices. Upon occurrence of the trigger condition, the operations can further include forwarding the call to a mobile device of a second user associated with the one or more units.

Yet another example aspect of the present disclosure is directed to a door access system for premises having a plurality of units. The door access system can include a primary interface device communicatively coupled to a network. The primary interface device can be located at an entrance of the premises. The door access system can include a plurality of secondary interface devices communicatively coupled to the primary interface device via the network. Each of the plurality of secondary interface devices can be in a corresponding unit of the plurality of units of the premises. The primary interface device can include one or more processors and one or more memory devices. The one or more memory devices can be configured to store computer-readable instructions that, when executed by the one or more processors, cause the one or more processors to perform operations. The operations can include receiving a selection of one or more units of the plurality of units associated with the premises from a first user. The operations can further include sending a call to one or more of the plurality of secondary interface devices based on the selection. The operations can further include monitoring for a trigger condition after the call is sent to the one or more secondary interface devices. Upon occurrence of the trigger condition, the operations can further include forwarding the call to a mobile device of a second user associated with the one or more units.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
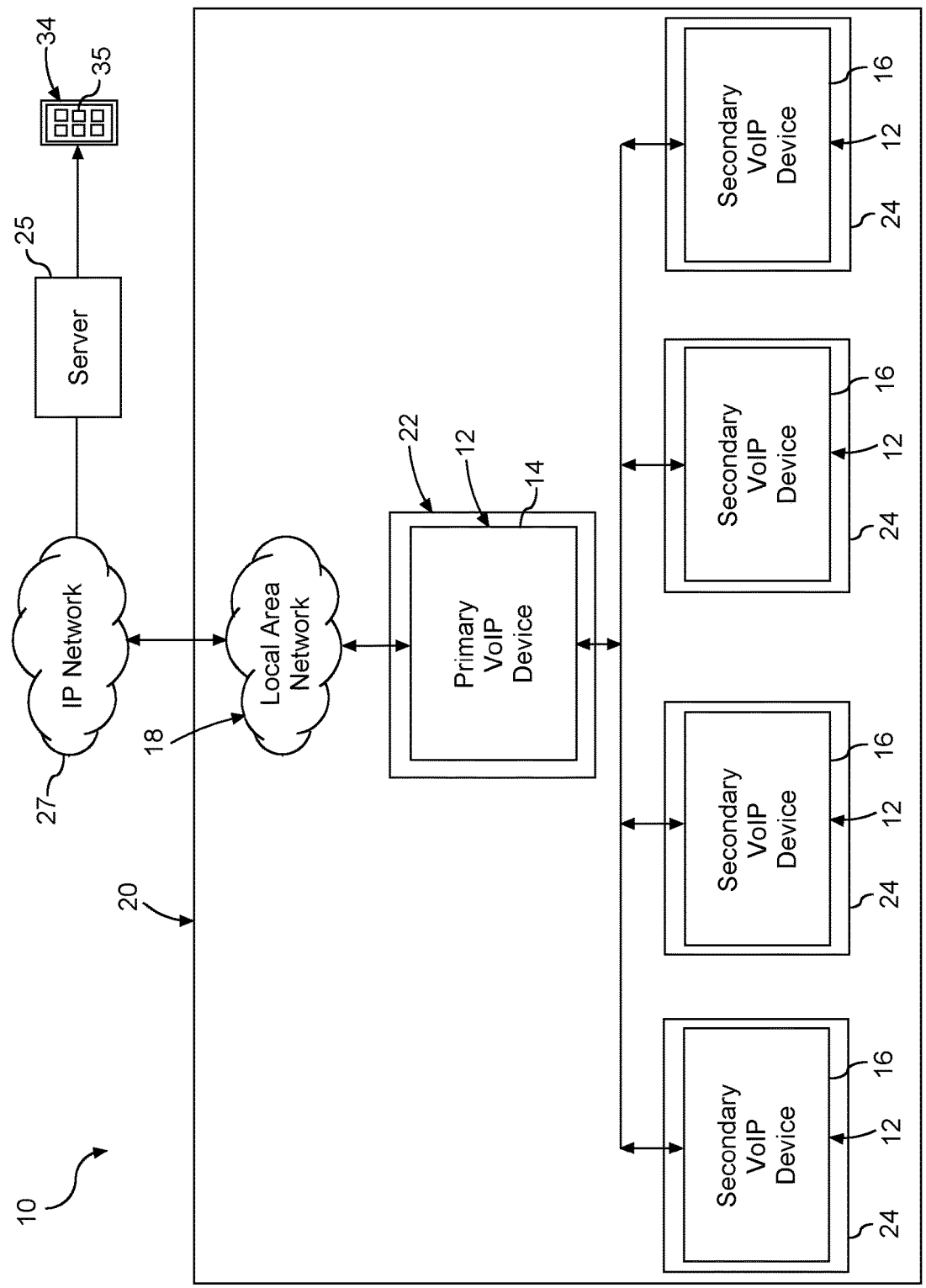
FIG. 1 illustrates a schematic diagram of an example door access system for multi-unit premises according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a method for access control of premises having a plurality of units. The premises described herein, for example, can include office buildings, residential buildings, or any other commercial and/or residential premises that can benefit from the systems and methods described herein.

In example implementations, a primary interface device (e.g., a voice over internet protocol (VoIP) device) can be located at an entrance of multi-unit premises. The primary interface device can have a camera and one or more user input devices. As such, the one or more user input devices provide the ability of a first user (e.g., a prospective visitor) to select a unit (e.g., a desired destination) within the multi-unit premises. In some implementations, the camera of the primary interface device can be activated in response to the first user selecting the unit. In this manner, the camera can obtain one or more images of the first user. In some implementations, the one or more images can be stored locally on one or more memory devices associated with the primary interface device. Alternatively and/or additionally, the one or more images can be provided over a network to a remote device (e.g., server). In this manner, the one or more images can be stored on the remote device. As will be discussed below in more detail, each (e.g., office, room, apartment) of the plurality of units can include a similar secondary interface device with a display screen and camera that can be used to have a video conversation with the user at the entrance.

More particularly, a second user (e.g., a tenant) can answer the call from the first user at the entrance via the secondary interface device and allow access to the selected unit if so desired. According to example embodiments of the present disclosure, if the second user (e.g., the tenant) does not answer the call from the first user, the call can be forwarded to one or more additional users (e.g., doorman, etc.). Furthermore, if the one or more additional users do not answer the call, the call can be forwarded to a mobile device in the second user's possession. As used herein, a mobile device can be a user device capable of being carried by hand of the user while in operation. Example mobile devices may include smartphones, tablets, laptops, wearable devices, displays with one or more processors, etc.

Once forwarded, the second user (e.g., the tenant) can be presented a video of the prospective visitor on a display associated with the mobile device (e.g., in a graphical user interface implemented as part of an application executed on the mobile device). The user can have the option of taking the call or declining the call. If declined, the call can be terminated, and the first user is not allowed access. If the call is accepted, the second user can then have a video and/or voice conversation with the prospective visitor. If the second user then decides to allow the visitor access, the second user could remotely "buzz" the visitor into the building from the mobile device.

For instance, in one example implementation, an access control method can include receiving data indicative of a selection of a unit of the plurality of units associated with the premises from a first user via a primary interface device communicatively coupled to a network, such as an Internet Protocol (IP) network. Further, the selected unit can be associated with a second user. The method may also include sending a call to a secondary interface device located in the selected unit. Further, the method can include monitoring for a trigger condition, such as an expiration of a time period, after the call is sent to the secondary interface device. Upon occurrence of the trigger condition, the method can include forwarding the call over the network to a user device (e.g., a mobile device) of the second user via the primary interface device.

In some embodiments, the method may include receiving the selection of the unit of the plurality of units associated with the premises from the first user via a primary user input device of the primary interface device. The primary user input device can be, for instance, a graphical user interface presented on a display screen associated with the primary interface device.

In some embodiments, after forwarding the call, the method may include providing for display a video of the first user at the premises via an application executed on the mobile device of the second user. In some embodiments, after forwarding the call, the method may include receiving data indicative of acceptance of the call by the second user and receiving data indicative of the second user selecting to have a video conference or an audio conference with the first user.

In some embodiments, after receiving the data indicative of acceptance of the call, the method may include receiving data from the mobile device indicative of the second user selecting to provide access to the premises. In some embodiments, after receiving the data from the mobile device indicative of the second user selecting to provide access to the premises, the method may include unlocking the entrance of the premises.

In some embodiments, after forwarding the call, the method may include receiving data indicative of denial of the call by the second user, and in response to receiving data indicative of denial of the call by the second user, denying the first user access to the premises (e.g., not unlocking the entrance of the premises and/or providing a notification or alert associated with denial of entry.

Example aspects of the present disclosure are further directed to a door access system having capabilities of implementing the methods described herein. For example, example aspects of the door access system may include a primary interface device (such as a VoIP device) configured to be connected to a network (e.g., via fiber optic cables). Example aspects of the door access system may also include a similarly configured secondary interface device that communicates with the primary interface device. As such, the door access system is configured to allow remote access to multi-unit premises.

More specifically, the primary interface device can be located at an entrance of the multi-unit premises. The secondary interface devices can be located in the individual units of the premises. The primary interface device can include a primary camera module, a primary two-way communication module, and a primary user input device for allowing a first user to select one of the units of the premises and initiate a call to the selected unit. In some implementations, the primary user input device can include a radio frequency identification (RFID) card reader. Each of the secondary interface devices may include a secondary camera module, a secondary two-way communication module, and a secondary user input device. Thus, if a second user is present in the selected unit, the second user can answer the call via the associated secondary user input device and allow access to the selected unit if desired. However, if the second user is not present in the selected unit, the call can be forwarded to a mobile device of the second user via the primary interface device. In addition, the second user and the first user can communicate via the camera modules and/or the two-way communication modules. Accordingly, example aspects of the door access system allow the second user to provide remote access to the premises and also allow the second user to communicate with the first user as needed.

In some implementations, the first user can simultaneously select multiple units (e.g., two or more) of the plurality of units on the premises. In this manner, the first user can call a group (e.g., multiple tenants) of people on the premises. It should be understood that once the call is answered by the second user (e.g., a person in group of people), the call can continue between the first user and the second user as discussed above.

In some implementations, at least one of the primary interface device and the secondary interface device can include one or more motion sensors (e.g., accelerometers). In this manner, the one or more motion sensors can obtain data indicative the device (e.g., primary interface device, secondary interface device) being tampered with by a user. In some implementations, the device can be configured to activate the camera in response to the motion sensors obtaining data indicative of the device being tampered with by the user. In this manner, the camera can obtain one or more images of the user tampering with the device.

In some implementations, the device (e.g., primary interface device, secondary interface device) can be configured to provide an alarm in response to the one or more motion sensors obtaining data indicative of the device being tampered with by the user. For instance, the alarm can be an audible or visual alarm provided at the affected device. Alternatively or additionally, the device can be configured to provide a notification in response to the one or more motion sensors obtaining data indicative of the device being tampered with by the user. For instance, the notification can, in some implementations, be a text message, e-mail, or any other suitable type of electronic notification provided over the network and indicative of the affected device being tampered with by the user. In some implementations, the notification can be provided to the mobile device of one or more users (e.g., tenant) associated with the unit in which the affected device is located. Alternatively or additionally, the affected device can be deactivated for a predetermined amount of time or until the affected device is reactivated by authorized personnel.

In some implementations, the first user can gain access to the premises via a RFID card. For instance, the first user can position the RFID card such that the RFID reader of the primary interface device can obtain data indicative of whether the RFID card is associated with a user granted access to the premises. In this manner, tenants of the premises having RFID cards can swipe their RFID card to gain entry into the premises.

Example aspects of the present disclosure provide a number of technical effects and benefits. For example, example aspects of the systems and methods of the present disclosure allow a tenant of the premises to provide remote access to the premises when he or she is not present at the premises. In addition, example aspects of the systems and methods of the present disclosure allow the tenant to have a video and/or audio conversation with a visitor from inside the premises or from a remote location. Moreover, example aspects of the systems and methods of the present disclosure can be easily implemented using interface devices (e.g. such as the VoIP devices described herein) and using an application on a mobile device.

Referring now to the drawings, FIG. 1 illustrates a schematic diagram of a door access system 10 for multi-unit premises 20 having a plurality of units 24 according to example embodiments of the present disclosure. For example, as shown, the system 10 includes a plurality of interface devices 12. As mentioned, in some embodiments, the interface devices 12 described herein may include VoIP devices 12. Details concerning an example VoIP device are shown in Attachment A, which is incorporated herein by reference for all purposes.

More specifically, as shown, the VoIP devices 12 may include a primary VoIP device 14 communicatively coupled (e.g., over a network and/or via a wired or wireless connection) to a plurality of secondary VoIP devices 16. Further, the primary VoIP device 14 may be located at or near an entrance 22 of the premises 20, whereas the secondary VoIP devices 16 may be located in individual units 24 (e.g. offices or residences) of the premises 20. Moreover, as shown, the primary VoIP device 14 may be communicatively coupled to a network 18 located in the premises 20. The network(s) described herein can be any suitable type of network, such as a local area network (e.g., intranet), wide area network (e.g., internet), low power wireless network (e.g., Bluetooth Low Energy (BLE), Zigbee, etc.), or some combination thereof and can include any number of wired or wireless links. In general, communication over the network can be implemented via any type of wired or wireless connection, using a wide variety of communication protocols, encodings or formats, and/or protection schemes.

In some embodiments, as shown, the network 18 may be a local area network communicatively coupled to an Internet Protocol (IP) network 27. Alternatively, the local area network may be and/or include the IP network 27.

In some embodiments, example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable wired and/or wireless communication technologies can be used without deviating from the scope of the present disclosure.

Example network connection(s) in accordance with example aspects of the present disclosure can be made via simplex LC connectors, each utilizing single mode fiber with a bi-directional transceiver. One port can, for example, transmit at 1310 nm and receive at 1550 nm, while the other port can transmit at 1550 nm and receive at 1310 nm. Network speed is typically 100 Mb/s. A USB connector can also be provided on the printed circuit board (PCB) inside the VoIP devices 12 to enable a direct serial connection to, for example, a laptop PC for configuration and management purposes.

Still referring to FIG. 1, the system 10 may also include a remote computing device, such as a server 25 (e.g. a web server) that is configured to forward calls received from the IP network 27 and/or the local area network 18 to a mobile device 34. For instance, the server 25 can communicate data collected by primary and secondary interface devices 14, 16 to the mobile device 34 of the second user. The server 25 can also store historical records of the data. Thus, the stored data can be accessed, for instance, by a user via a suitable interface (e.g., web browser). In some implementations, the server 25 can also be configured to process the data collected by the primary and secondary interface devices 14, 16. In addition, the server 25 can be configured to generate one or more control signals based on the processed data. The one or more control signals can be communicated to the mobile device 34 over the network 27.

In some embodiments, the mobile device 34 may include at least one application 35 that can be executed thereon. The application can include computer-readable instructions that when executed by one or more processors, cause the one or more processors to perform operations. A user (e.g. a tenant or resident) of the premises 20 can interact with the application 35 to provide remote access thereto as desired, as described in more detail below.

Figure 2:
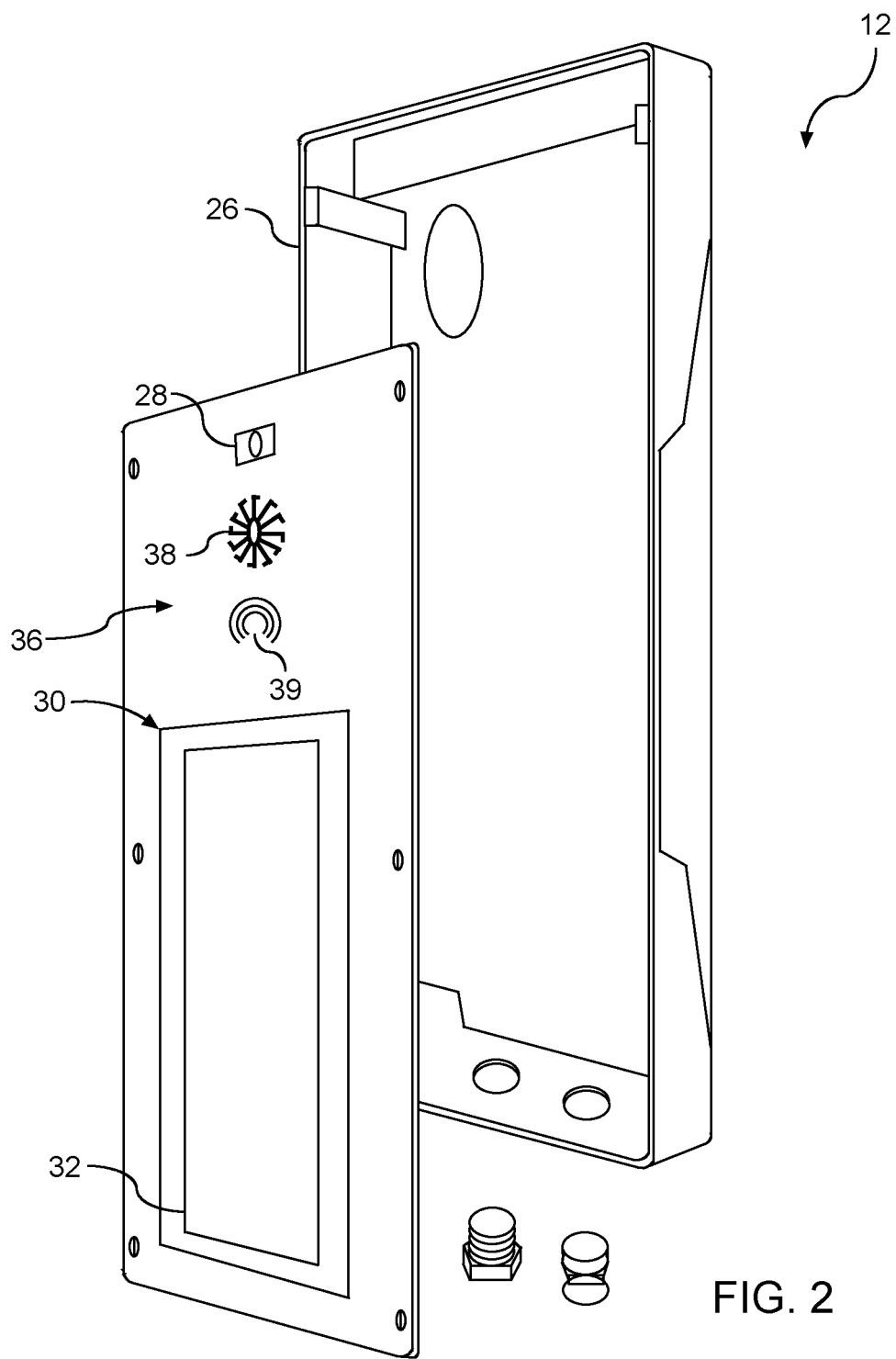
FIG. 2 illustrates a perspective view of an example enclosure for an interface device according to example embodiments of the present disclosure.

Referring now to FIG. 2, one example of a user interface for a typical VoIP device 12 (such as the primary and secondary VoIP devices 12, 14 described herein) is illustrated. In further embodiments, the user interface may also include a graphical user interface 30 presented on a display screen 32. In such embodiments, as shown, the display screen 32 may include a touch screen. Thus, as shown, the display screen 32 may be configured to allow a first user to select one of the units 24 of the premises 20 and initiate a call to the selected unit by dialing or selecting a preprogrammed number. Further, the VoIP devices 12 described herein may be low power, fiber optic IP telephones such as a VoIP industrial telephone product available from, for example, GAI-Tronics that uses an Analog Devices Inc. digital signal processor (DSP) and standard VoIP/SIP software. The VoIP industrial telephone product can be customized to perform certain operations as described in accordance with an aspect of illustrative embodiments of the present disclosure. In addition, as shown, the VoIP devices 12 can include a camera module 28 and a two-way communication module 36. More specifically, as shown, the two-way communication module 36 of the VoIP devices 12 may include a speaker 38 and a microphone 39.

It is to be understood that other keypads and/or buttons can be provided on the VoIP device 12 to allow dialing or selecting to multiple units. For example, the VoIP devices 12 can include twelve or more push buttons to enable a user to carry out actions such as starting a call. Button functions are defined and configurable in software. Configurable functions can include, but are not limited to, memory dial to a pre-configured SIP URI, optional PTT, End call, Accept incoming call, and Toggle on/off hook. In addition, the number of push buttons is only limited by the number required for the application. In addition, buttons can be optionally prioritized. Further, as shown, the VoIP device 12 may include an enclosure 26 that houses or protects the electrical components thereof.

By selecting one of the buttons on the display screen 32, a first user can initiate a call to the number associated with the button. For example, the selection is configured to make a direct call by causing the primary VoIP device 14 to initiate a call to a single end point. If a connected secondary interface device 16 receives an incoming call, it can be set to either ring, in which case a designated button can be selected or pressed to accept and answer, or to automatically connect (with or without a preceding alert tone). Thus, if the second user is present in the selected unit and answers the call, two-way speech and video can be established between the end points (i.e. via the display screens 32 of the primary and secondary VoIP devices 14, 16). Calls can be ended either by selecting a "call end" button by the receiving party ending the call, a configurable time out, or by the instigator of the call (i.e. the second user hangs up). In addition, the second user can provide the first user access to the premises 20 via the secondary VoIP device 16 in his unit if he desires to do so. However, if the second user is not present in the selected unit, the call can be forwarded to the mobile device 34 of the second user via the primary server 20 of the primary VoIP device 14.

Figure 3:
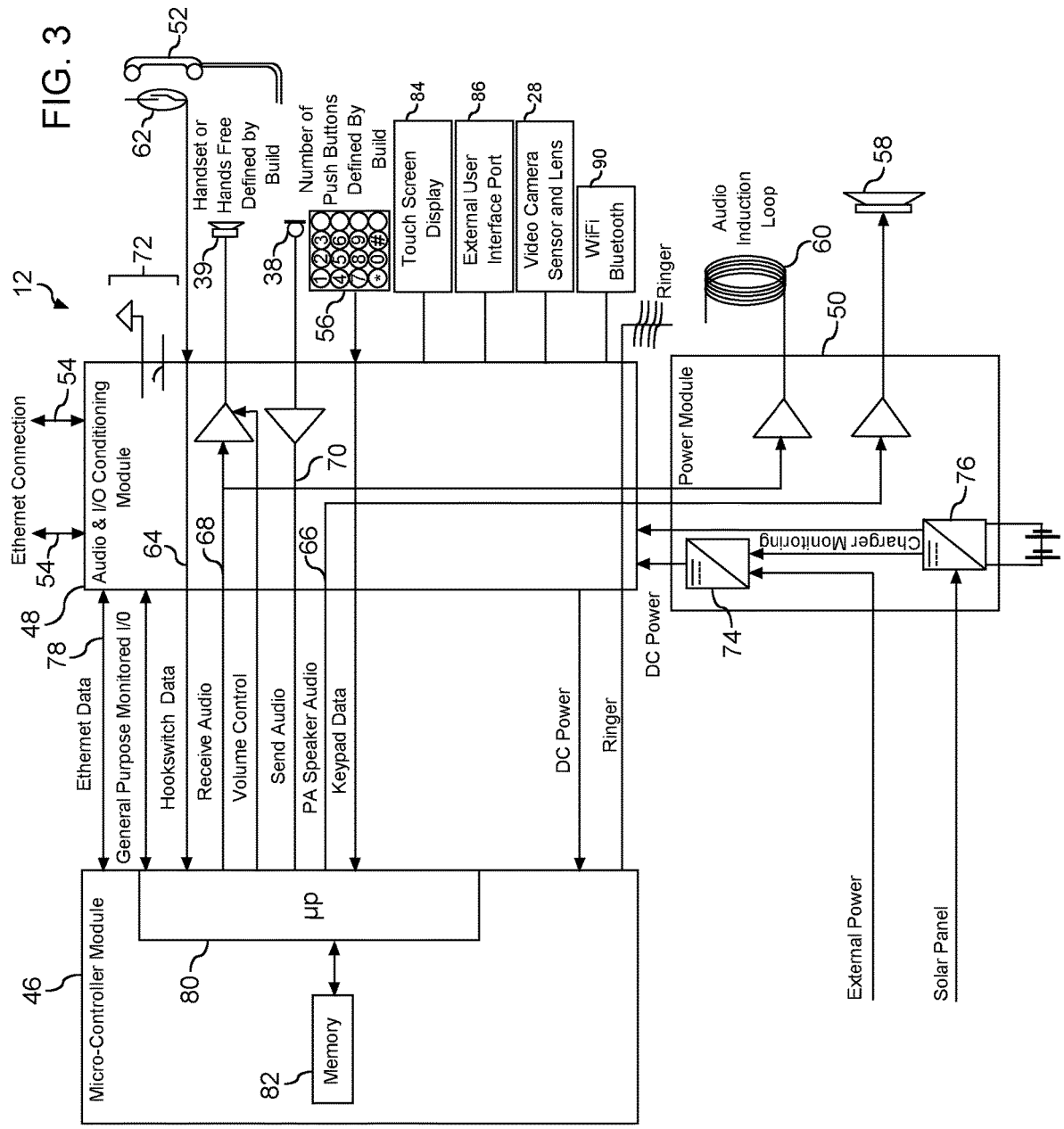
FIG. 3 illustrates a block diagram of various components of an interface device according to example embodiments of the present disclosure.

Referring now to FIG. 3, a schematic diagram of the electrical components of one of the VoIP devices 12 is illustrated. As shown, the illustrated VoIP device 12 includes, for example, a VoIP control board 46, a VoIP/phone interface board 48, and a power board 50. Further, as shown, the VoIP device 12 may be also provided with a handset 52 with integrated microphone and speaker or hands-free microphone and speaker, and can also be a single board implementation. The VoIP control board 46 is described in more detail below. The VoIP/phone interface board 48 is connected to an Ethernet network wirelessly or using fiber optic cable or copper, for example, via an Ethernet interface 54. The VoIP device 12 can be optionally provided with individual push buttons or a keypad board 56 (i.e., where applicable, such as providing two or more call buttons). In addition, as shown, the VoIP device 12 can also optionally include a touch screen display 84, the camera module 28 (which may include a sensor and lens), an external user interface port 86, and/or a Wi-Fi/Bluetooth interface 90. As such, in certain embodiments, a user can make various selections via the touch screen display 84. Further, the external user interface port 86 can be used to allow a user to connect various external devices to the VoIP device 12. For example, as shown, in one embodiment, the external user interface port 86 can be configured to allow a user to receive and/or provide audio via a Bluetooth-enable headset paired with the wireless interface 90. The VoIP unit or device 12 can have a power supply board 50 or, in an alternative implementation, an amplifier and power supply board 50 for operating a loudspeaker 58 to provide sufficiently loud audio output suitable for a location that may have significant ambient noise levels and/or inductive loop 60.

The VoIP device 12 may also be provided with a magnetic hook switch sensor 62 (e.g., coupled to the cradle of the handset 52), the output of which can be coupled to the VoIP/phone interface board 48 for providing on-hook/off-hook status data 64 of the handset 52 to the VoIP control board 46. As stated above, the VoIP/phone interface board 48 is configured to provide public address (PA) speaker audio 66, as well as earpiece/speaker audio 68 from the VoIP control board 46 for the handset or hands-free speaker and receive microphone audio 70 from the handset or separate microphone for the VoIP control board 46. The VoIP/phone interface board 48 is also configured to provide individual push buttons or keypad data from the keypad board 46 and DC power to the VoIP control board 46. LEDs and relays are provided as generally indicated at 72 for General Purpose Monitored Inputs/Outputs (I/O).

With continued reference to FIG. 3, power requirements for the VoIP devices 12 can be fulfilled from a battery/batteries charged by an external power source or a local solar panel, for example. Power supply conditioning, the charging and condition monitoring of the battery/batteries is performed by the power supply section 74, 76. The batteries are indicated in FIG. 3 as part of a power module 40 that can be part of a single board implementation for the device 12. Alternatively, the power requirements can be fulfilled by a permanent supply to the device 12. In addition, as shown, audio 66 for the speaker 58 may be routed through the power module 40 to allow for a public address (PA) function (e.g., where a larger amplifier is needed). An audio induction loop indicated generally at 60 enables a person using a hearing aid set to the 'T' setting to hear more clearly.

The VoIP/Phone interface board 48 and the VoIP control board 46 are configured to process Ethernet data 78. The VoIP control board 46 includes a programmable processor 80 and memory 82. In accordance with illustrative aspects of the present disclosure, the devices 12 are programmed (e.g., via software code provided to their respective processors 80) to establish and terminate point-to-point calls, among other operations in the VoIP system 10. As stated above, the microprocessor 80 can be an Analog Devices Inc. ADSP-BF536 Series digital signal processor (DSP) with standard VoIP/SIP software, for example. The VoIP control board 46 may employ an audio CODEC (e.g., 8 kHz G711A/U Law) to provide full duplex hands-free speech; that is, when in a call, the device 12's audio will be full duplex (i.e., transmit and receive simultaneously with no switching).

As stated above, power requirements for the VoIP devices 12 can be fulfilled from batteries 74, 76 charged respectively by an external power source or a local solar panel. The power consumption of the devices 12 is kept to a minimum by keeping the processor core 80 and other hardware powered down or in sleep mode until it is actually needed. In normal idle mode, only an onboard network switch can be fully working, that is, ready to react to any network packets destined for the main device 14. If the onboard network switch receives a packet not intended for it, the packet will merely be forwarded to the second port and not wake up the main processor 80. In this way the main, power intensive components are switched off or in low power mode until triggered by an event such as: Receipt of an appropriate packet such as the start of an incoming call or management access, Pressing a button, an alarm sensor such as low battery detection, or a timed activity such as SIP re-registration or speaker-microphone testing.

Figure 4:
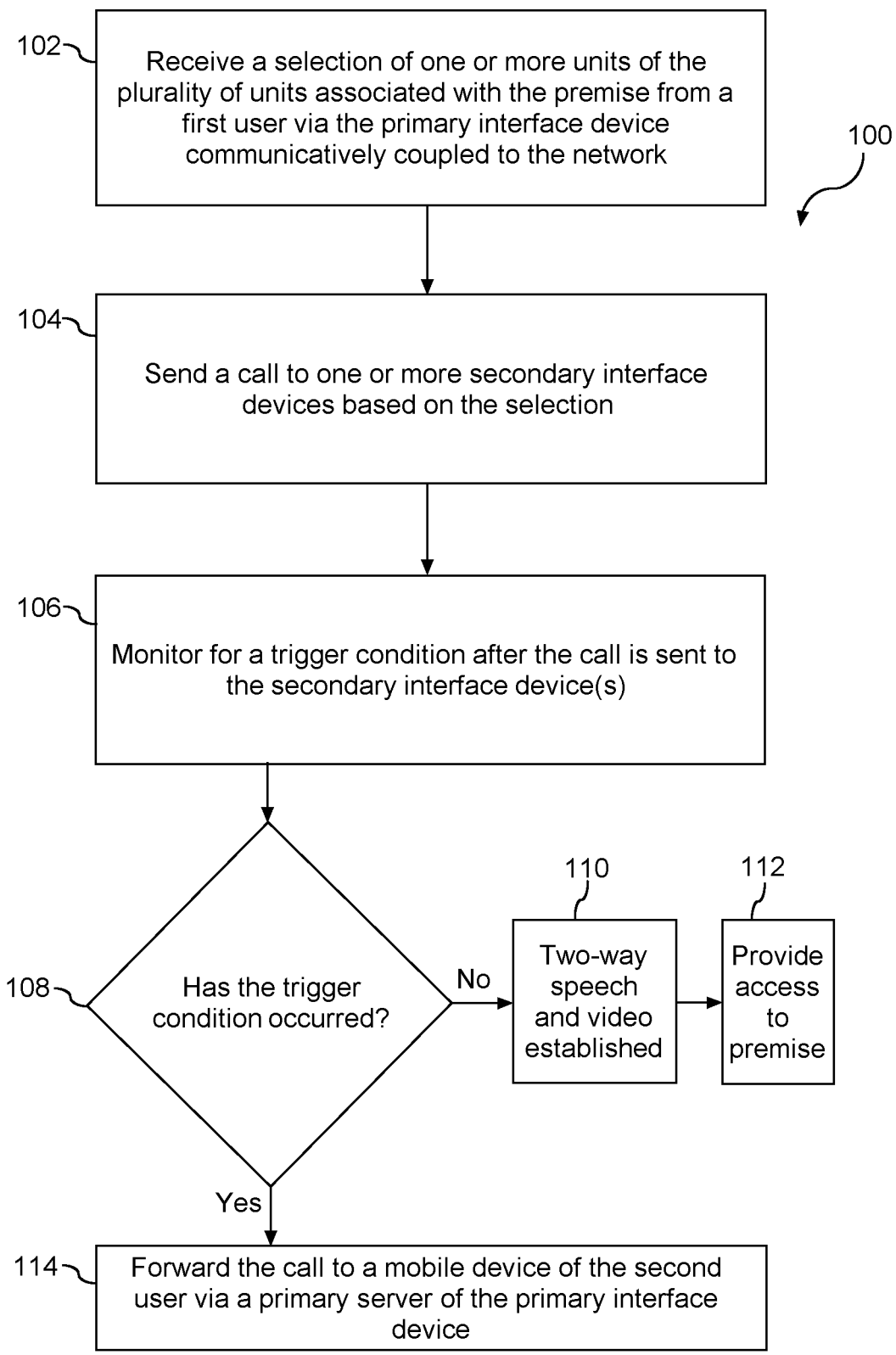
FIG. 4 illustrates a flow diagram of an example method according to example embodiments of the present disclosure.

Referring now to FIG. 4, a flow diagram of one embodiment of a method 100 for allowing remote access to an entrance of multi-unit premises 20 having a plurality of units is illustrated. In general, the methods according to the present disclosure will be discussed herein with reference to the access system 10 described above with reference to FIG. 1. However, it should be appreciated by those of ordinary skill in the art that the disclosed methods can generally be implemented with access systems having any other suitable configuration. In addition, although the method of FIG. 4 depicts steps performed in a particular order for purposes of illustration and discussion, the methods discussed herein are not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

As shown at 102, the method 100 includes receiving a selection of one or more units of the plurality of units 24 associated with the premises 20 from a first user via the primary VoIP device 14 communicatively coupled to the network 18. More specifically, in one embodiment, the method 100 may include receiving the selection of the one or more units from the first user via a primary user input device of the primary interface device 14.

As shown at 104, the method 100 further includes sending a call to a one or more secondary interface devices of the plurality of secondary interface devices 16 based on the selection at 102. The one or more secondary interface devices can be located in the one or more units 24 selected at 102. As shown at 106, the method 100 also includes monitoring for a trigger condition after the call is sent to the corresponding secondary interface device 16. For example, as mentioned, the trigger condition may include an expiration of a time period.

As shown at 108, the method 100 includes determining whether the trigger condition has occurred. If not, as shown at 110, two-way speech and video can be established between the end points (i.e. via the user input devices of the primary and secondary interface devices 14, 16). Further, as shown at 112, the second user can choose to provide the first user with access to the premises 20 via his secondary interface device 16. In some implementations, access to a lobby of the premises can be provided via controlling operation of a relay that is remote relative to the primary user interface device. More specifically, the relay can be provided within the interior of the premises. In this manner, the first user at the primary interface device cannot gain access to the relay to affect operation of the relay and, as a result, gain access to the interior of the premises. In some implementations, the relay can be a USB controlled relay module. It should be appreciated, however, that any suitable type of relay can be used to control operation (e.g. lock, unlock) of the door.

Alternatively, as shown at 114, if the trigger condition occurs, the method 100 includes forwarding the call to the mobile device 34 of the second user via the primary interface device 14. In some implementations, the call can be forward to a secondary device in one or more additional units (e.g., doorman, another tenant, etc.) prior to forwarding the call to the mobile device of the second user via the primary interface device 14. If the call is not answered by a user in the one or more additional units within a predetermined amount of the time, the call can then be forwarded to the mobile device 34 of the second user via the primary interface device 14.

After forwarding the call to the mobile device 34 of the second user 34 via the primary interface device 14, the method 100 may include providing for display a video of the first user at the premises 20 via the application 35 executed on the mobile device 34 of the second user. In certain embodiments, after forwarding the call, the method 100 may further include receiving data indicative of acceptance of the call by the second user and receiving data indicative of the second user selecting to have a video conference or an audio conference with the first user.

In such embodiments, after receiving the data indicative of acceptance of the call, the method 100 may include receiving data from the mobile device 34 indicative of the second user selecting to provide access to the premises. In another embodiment, after receiving the data from the mobile device 34 indicative of the second user selecting to provide access to the premises, the method 100 may include unlocking the entrance of the premises 20. Alternatively, after forwarding the call, the method 100 may include receiving data indicative of denial of the call by the second user, and in response, denying the first user access to the premises 20. For example, in one embodiment, the mobile device 34 may send a lock signal to the primary interface device 14 that maintains the entrance of the premises 20 in a locked position.

Figure 5:
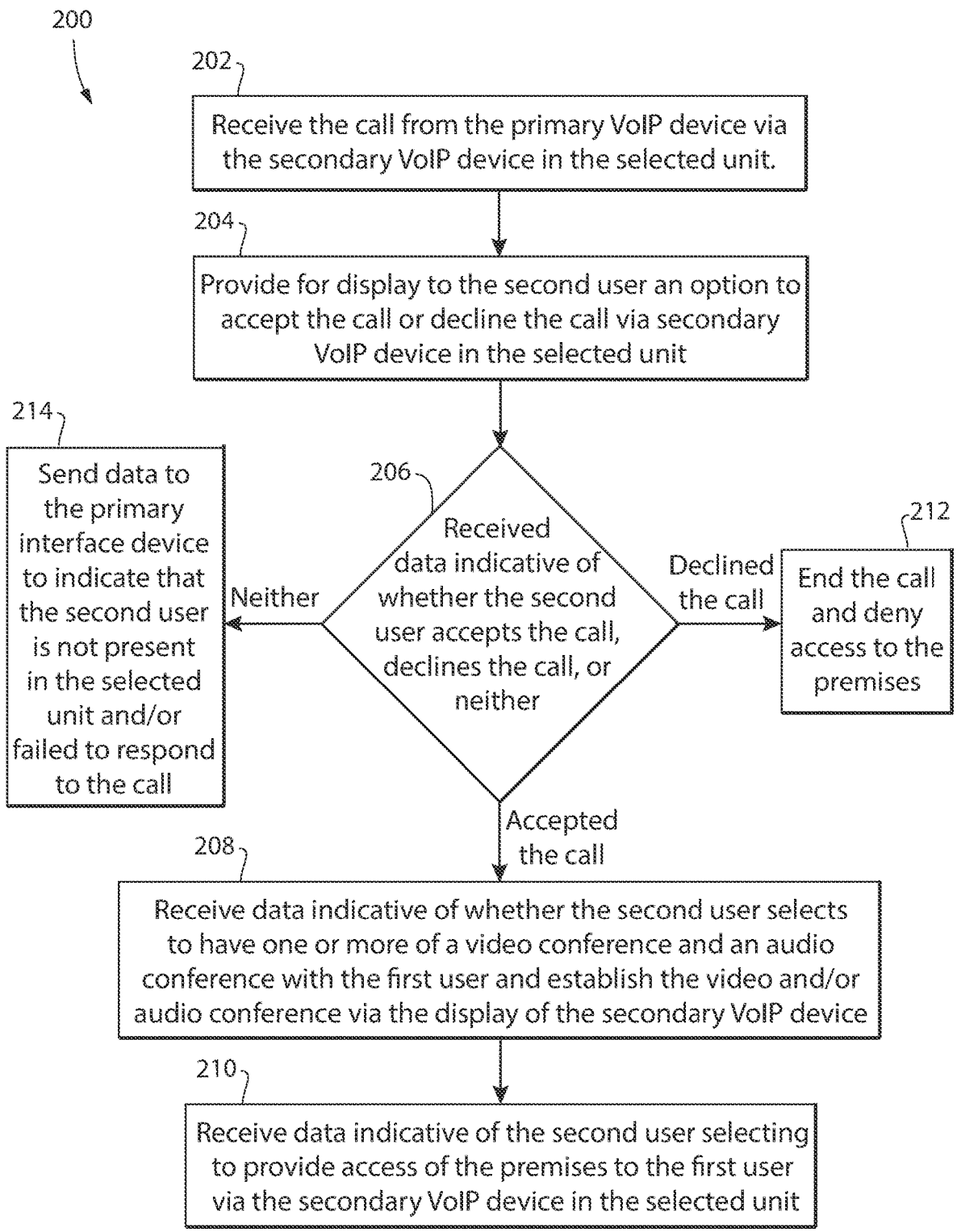
FIG. 5 illustrates a flow diagram of another example method according to example embodiments of the present disclosure.

FIG. 5 depicts a flow diagram of another embodiment of a method 200 for interacting with a user interface of an application implemented on a mobile device to allow access to a unit in a multi-unit premises. In addition, the method of FIG. 5 depict steps performed in a particular order for purposes of illustration and discussion, the methods discussed herein are not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

As shown at 202, the method 200 includes receiving the call from the primary VoIP device 14 via the secondary VoIP device 16 in the selected unit. As shown at 204, the method 200 further includes providing for display to the second user an option to accept the call or decline the call via the secondary VoIP device 16 in the selected unit. As shown at 206, the method 200 further includes receiving data indicative of whether the second user accepts the call, declines the call, or neither. This data can be indicative of a user interaction with a user interface implemented on the mobile device as part of an application executed on the mobile device.

As shown at 208, if the data indicates that the second user accepted the call, the method 200 may include establishing a video conversation and/or an audio conversation via the display of the secondary VoIP device 16 in the selected unit. In addition, as shown at 210, the method 200 may include receiving data indicative of the second user selecting to provide access (e.g., via a user interface) of the premises 20 to the first user via the secondary VoIP device 16 in the selected unit. Alternatively, as shown at 212, if the data indicates that the second user declined the call, the method 200 can include ending the call and/or denying access to the premises 20. As shown at 214, if the data indicates that the second user failed to accept or decline the call, the method 200 can include sending data to the primary interface device 14 to indicate that the second user is not present in the selected unit or simply failed to respond to the call. Thus, upon receipt of such data, the primary interface device 14 is configured to forward the call to the mobile device 34 of the second user via the primary interface device 14 as described herein.

It will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present disclosure can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present disclosure can be easily construed as within the scope of the disclosure by programmers skilled in the art to which the present disclosure pertains. Method steps associated with the illustrative embodiments of the present disclosure can be performed by one or more programmable processors executing a computer program, code or instructions to perform functions (e.g., by operating on input data and/or generating an output). Method steps can also be performed by, and apparatus of the disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in the remote station, Electronic medical device, a server, or a combination thereof. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The above-presented description and figures are intended by way of example only and are not intended to limit the present disclosure in any way. It is particularly noted that persons skilled in the art can readily combine the various technical aspects of the various elements of the various illustrative embodiments that have been described above in numerous other ways, all of which are considered to be within the scope of the disclosure.

What is claimed is:

1. A door access system for premises having a plurality of units, the door access system comprising:
   a primary interface device communicatively coupled to a network, the primary interface device located at an entrance of the premises; and
   a plurality of secondary interface devices communicatively coupled to the primary interface device via the network, each of the plurality of secondary interface devices located in a corresponding unit of the plurality of units,
   the primary interface device comprising one or more processors and one or more memory devices, the one or more memory devices configured to store computer-readable instructions that when executed by the one or more processors cause the one or more processors to perform operations, the operations comprising:
      receiving a selection of one or more units of the plurality of units associated with the premises from a first user;
      sending a call to one or more secondary interface devices of the plurality of secondary interface devices based on the selection, the one or more secondary interface devices located in the one or more units;
      monitoring for a trigger condition after the call is sent to the one or more secondary interface devices;
      upon occurrence of the trigger condition, forwarding the call to a mobile device of a second user associated with the one or more units;
      after forwarding the call, receiving data indicative of acceptance of the call by the second user; and
      after forwarding the call, receiving data indicative of the second user selecting to have a video conference or an audio conference with the first user;
   wherein the trigger condition comprises an expiration of a time period.

2. A method for access control of premises having a plurality of units, the method comprising:
   receiving a selection of one or more units of the plurality of units associated with the premises from a first user via a primary interface device communicatively coupled to a network;
   communicating with one or more secondary interface devices based on the selection, the one or more secondary interface devices located in the one or more units;
   monitoring for a trigger condition during or after said communicating with the one or more secondary interface devices;
   upon occurrence of the trigger condition, communicating, via the primary interface device, with a mobile device of a second user associated with the one or more units;
   after said communicating, via the primary interface device, with the mobile device of the second user, receiving data indicative of acceptance of said communication by the second user; and
   subsequent to receiving data indicative of acceptance of said communication, receiving data indicative of the second user selecting to have one or more of a video conference and an audio conference with the first user;
   wherein the trigger condition includes an expiration of a time period.

3. The method of claim 2, further comprising:
receiving the selection of the one or more units of the plurality of units associated with the premises from the first user via a primary user input device of the primary interface device.

4. The method of claim 2, wherein the network is an Internet Protocol (IP) network and at least one of the primary interface device and the secondary interface device includes a voice over internet protocol (VoIP) device.

5. The method of claim 2, further comprising:
after said communicating, via the primary interface device, with the mobile device of the second user displaying a video of the first user at the premises via an application executed on the mobile device of the second user.

6. The method of claim 2, further comprising:
after receiving the data indicative of acceptance of the communication, receiving data from the mobile device indicative of the second user selecting to provide access to the premises.

7. The method of claim 6, further comprising:
after receiving the data from the mobile device indicative of the second user selecting to provide access to the premises, unlocking an entrance of the premises via the primary interface device.

8. The method of claim 2, further comprising:
after said communicating, via the primary interface device, with the mobile device of the second user, receiving data indicative of denial of the communication by the second user; and
in response to receiving data indicative of denial of the communication by the second user, denying the first user access to the premises via the primary interface device.

9. The method of claim 2, further comprising:
upon occurrence of the trigger condition and prior to said communicating, via the primary interface device, with the mobile device of the second user communicating with a secondary interface device in an additional unit of the plurality of units;
monitoring for the trigger condition after said communicating with the secondary interface device in the additional unit; and
upon occurrence of the trigger condition after said communicating with the secondary device in the additional unit, communicating with the mobile device of the second user via the primary interface device.

10. An interface device assembly configured for allowing access to premises having a plurality of units, the interface device assembly comprising:
a primary interface device communicatively coupled to a network, the primary interface device comprising one or more processors and one or more memory devices, the one or more memory devices configured to store computer-readable instructions that when executed by the one or more processors cause the one or more processors to perform operations, the operations comprising:
receiving a selection of one or more units of the plurality of units associated with the premises from a first user;
sending a call to one or more secondary interface devices based on the selection, the one or more secondary interface devices located in the one or more units;
monitoring for a trigger condition after the call is sent to the one or more secondary interface devices;
upon occurrence of the trigger condition, forwarding the call to a mobile device of a second user associated with the one or more units;
after forwarding the call, receiving data indicative of acceptance of the call by the second user; and
after forwarding the call, receiving data indicative of the second user selecting to have a video conference or an audio conference with the first user;
wherein the trigger condition comprises an expiration of a time period.

11. The interface device assembly of claim 10, wherein the primary interface device further comprises a primary camera module, a primary two-way communication module, and a primary user input device, the primary user input device configured for receiving the selection of the unit of the plurality of units associated with the premises from the first user.

12. The interface device assembly of claim 10, wherein the primary interface device is communicatively coupled to the one or more secondary interface devices via the network, and wherein the one or more secondary interface devices comprise a secondary camera module, a secondary two-way communication module, and a secondary user input device.

13. The interface device assembly of claim 12, wherein the primary interface device is located at an entrance of the premises.

14. The interface device assembly of claim 10, wherein at least one of the primary interface device or the one or more secondary interface devices comprises a voice over internet protocol (VoIP) device.

15. The interface device assembly of claim 10, wherein the operations further comprise:
after forwarding the call, providing for display a video of the first user at the premises via an application executed on the mobile device of the second user.

16. The interface device assembly of claim 10, the operations further comprising:
after receiving the data indicative of acceptance of the call, receiving data from the mobile device indicative of the second user selecting to provide access to the premises.

17. The interface device assembly of claim 10, the operations further comprising:
after forwarding the call, receiving data indicative of denial of the call by the second user; and
in response to receiving data indicative of denial of the call by the second user, denying, via the primary interface device, the first user access to the premises.

* * * * *